Patented Aug. 16, 1932

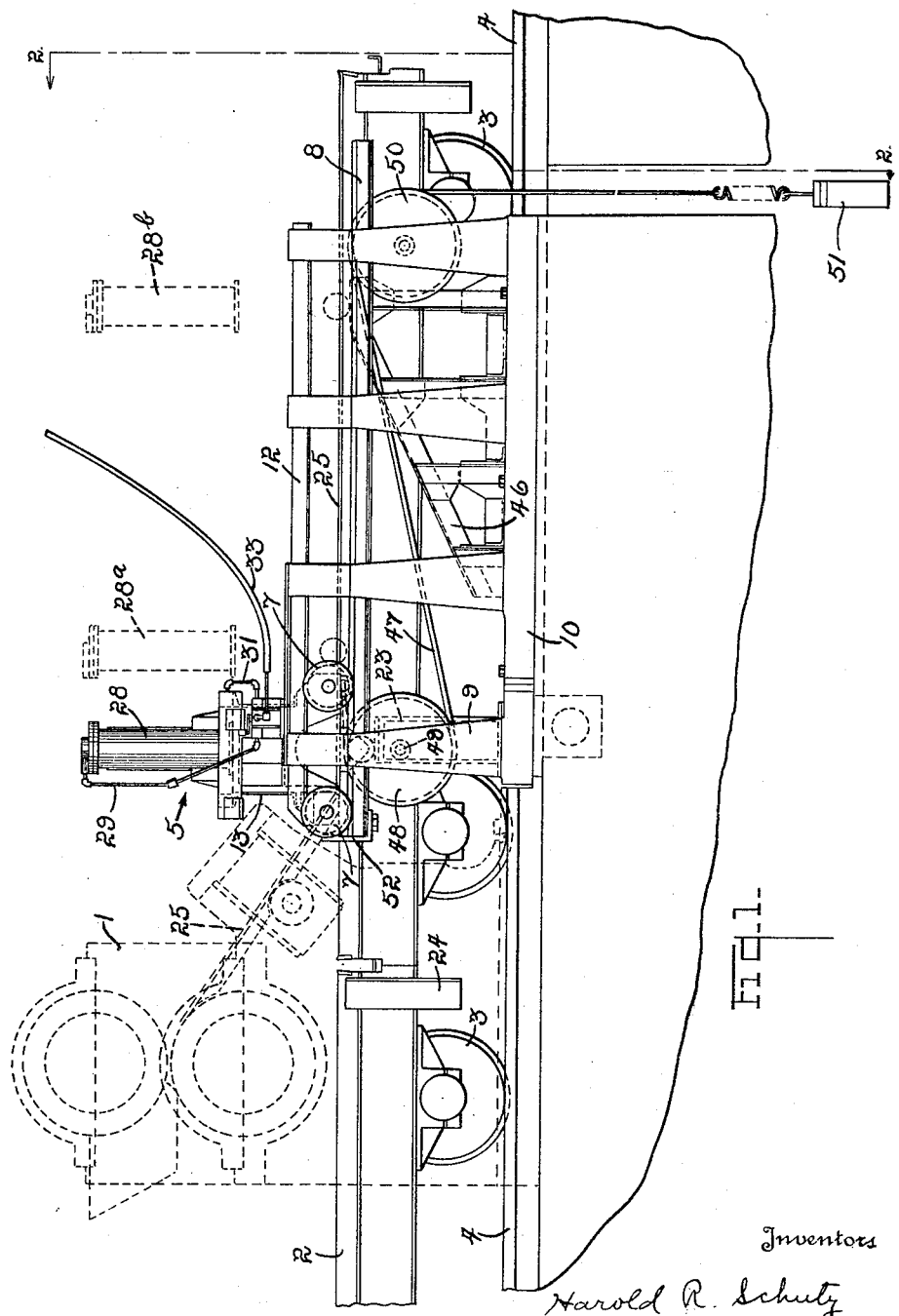

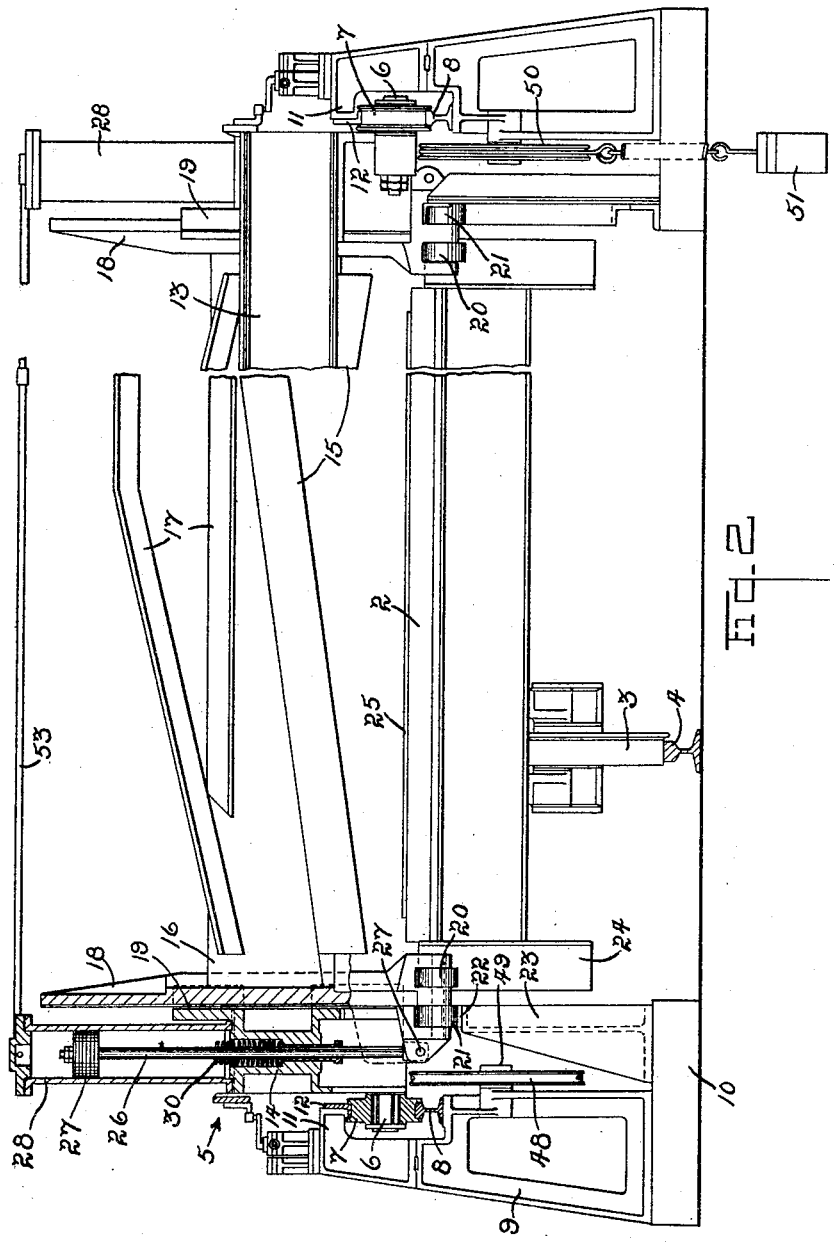

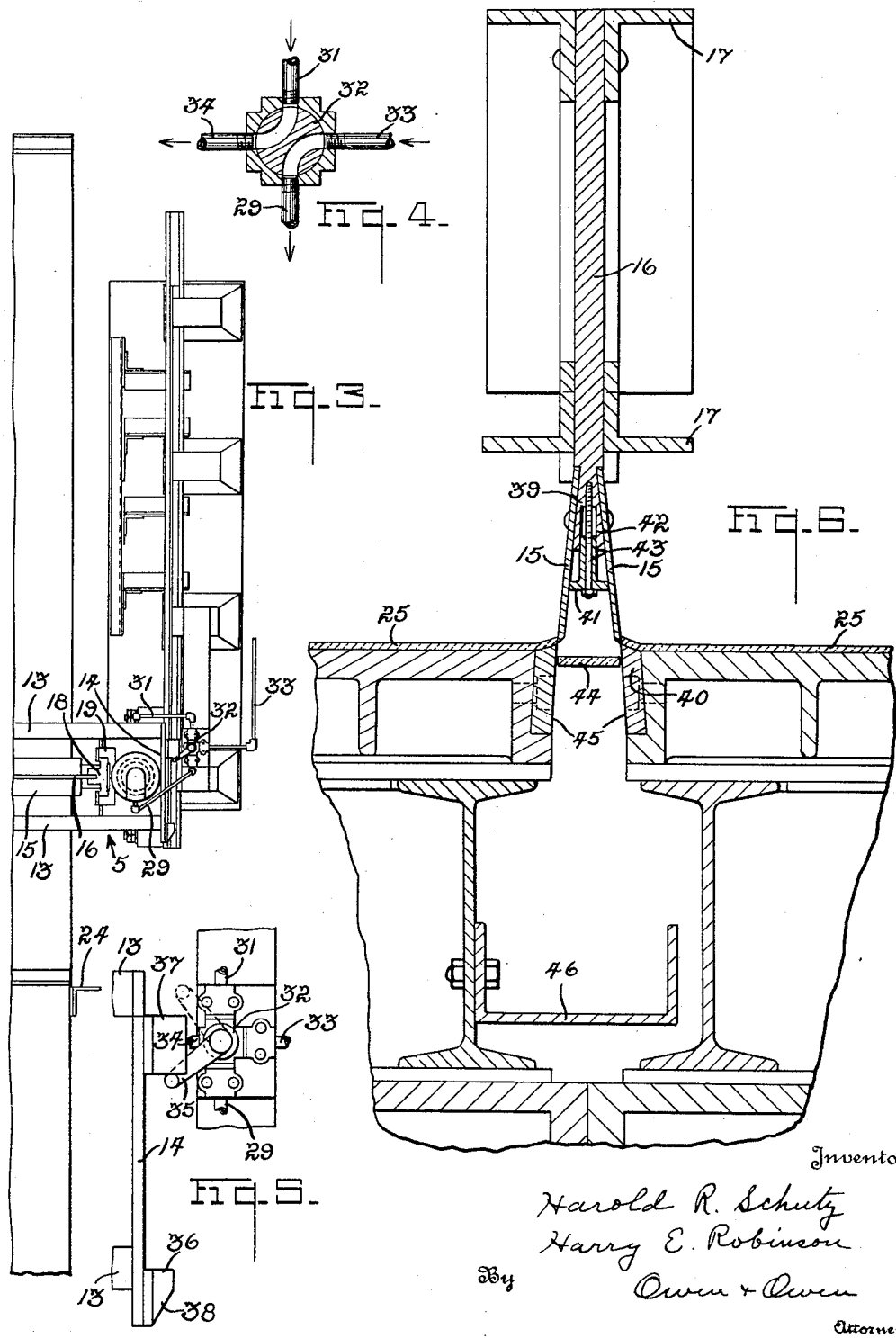

1,872,508

UNITED STATES PATENT OFFICE

HAROLD R. SCHUTZ AND HARRY E. ROBINSON, OF TOLEDO, OHIO, ASSIGNORS, BY MESNE ASSIGNMENTS, TO LIBBEY-OWENS-FORD GLASS COMPANY, OF TOLEDO, OHIO, A CORPORATION OF OHIO

CUTTING DEVICE

Application filed April 18, 1928. Serial No. 270,878.

This invention relates to a device adapted for use in cutting sheet material, as for example, in cutting rolled glass just after it leaves the rolls and while it rests on the tables used for carrying the glass to the leer.

In the art of manufacturing flat glass, it is desirable to roll out a strip of glass which is longer than can be conveniently handled in one piece in the leer. This makes it necessary to provide some means of severing the rolled strip of glass into sections of a size suited to existing leers. It is also desirable to remove the rounded ends of the rolled strip of glass so that only rectangular sections remain. The tools which are now used for pushing the glass sheets into successive positions in the leer will not operate satisfactorily unless the sheets have squared ends. The operation of thus severing the glass should take place soon after the sheet leaves the rolling machine. It is proposed, therefore, to perform this operation of severing just after the glass has been laid on the travelling tables which carry the sections to the respective ovens.

More specifically stated, the invention relates to a cutting element mounted on a carriage which is moved along with one of the tables, while the cutting element is moved across the glass to sever the same, after which the carriage and the cutting element, as the tables continue their travel, are restored to their original positions, in readiness for the next severing operation.

The general object of the present invention is to provide a cutting device of the character stated, which is adapted to move forwardly at intervals in coordination with the traveling tables, and in connections therewith, improved means for controlling the actuation of the cutting element vertically with respect to the tables. Improved means is also provided for adjusting the shearing engagement of the knives with the ledger blades with which they cooperate.

The invention consists further in various novel combinations of elements, the objects and advantages of which will be more particularly described in connection with the accompanying drawings, illustrating the preferred embodiment of the same.

In the drawings:

Figure 1 is a side elevation of the invention operatively associated with the delivery end of a glass rolling machine, the latter being shown in broken lines.

Fig. 2 is a transverse view showing one side of the cutting device in section and the other side in elevation.

Fig. 3 is a plan view of one side of the device.

Fig. 4 is a detail sectional view of a valve for controlling the compressed air which assists in raising and lowering the cutting element.

Fig. 5 is a detail view illustrating the valve shifting means.

Fig. 6 is a sectional view, on an enlarged scale, taken transversely of the cutting element and showing the adjacent ends of two tables, with which the cutting element cooperates.

As shown in the drawings, the invention is associated with the delivery end of a rolling machine 1 and is adapted to perform the cutting operation as soon as possible after the glass leaves the rolls. Associated with the rolling machine 1 are a series of tables 2, which have a slow continuous travel in timed relation to the operation of the rolling machine, so as to receive the glass as it is delivered in a continuous ribbon from the rolls. These tables are supported on wheels 3 which are guided on tracks 4.

The cutting device comprises a carriage 5 having laterally disposed stub shafts or axles 6, on which are mounted rollers 7. These rollers are guided on tracks 8, which are supported on stands 9 mounted on bases 10 at the sides of the table runway. Thus, the carriage is supported above the path of the tables and is guided for movement in the same direction as the tables. Secured to the stands 9 are overhanging extensions 11, carrying guide bars 12, which are located over the rollers 7 with a slight clearance, so that the knife cannot tip out of its proper position during the cutting of the glass.

The carriage has two channel bars 13 which are disposed transversely above the table in spaced relation to each other and connected at their ends by frame pieces 14. The cutting element comprises blades 15 secured to opposite faces of a girder 16 which is reinforced by angle bars 17. The girder 16 is secured at its ends to vertical slides 18, which are adapted to move upwardly or downwardly in guideways 19 secured to the carriage 5. Each slide 18 carries at its lower end two rollers 20 and 21 which are mounted on a transverse axis, and constitute a medium through which the position of the cutting element is determined. In its initial position, each roller 21 rests upon a short track 22 secured to the upper end of a stand 23 mounted on the base 10. Each table 2 carries an abutment 24 which is adapted to engage the roller 20 and to advance the cutting element together with the carriage 5 at the same rate of travel as the table. The sheet of glass 25 is fed to the table just before it passes beneath the cutting element. Soon after the cutting element begins to advance with the table, the rollers 21 leave the ends of the tracks 22, permitting the cutting element to drop.

In order to aid in controlling the up and down movement of the cutting element, a piston rod 26 is pivotally connected at its lower end, as at 27, to the lower end of the slide 18, and is provided at its upper end with a piston head 27, which operates within a cylinder 28 secured to the end 14 of the carriage frame. Through a pipe 29, compressed air is supplied to the upper end of the cylinder to force the cutting element downwardly by a quick movement. This downward movement is checked without any sudden shock, by suitable means which, in the present instance, is represented by a spring 30 seated within the lower head of the cylinder. To assist in raising the cutting element, compressed air is supplied to the lower end of the cylinder through a pipe 31.

The admission of compressed air first to one end of the cylinder 28 and then to the other end thereof is controlled by means of a valve 32, the compressed air being supplied from any suitable source through a pipe 33. When the valve 32 is in the position shown in Fig. 4, it permits the compressed air to flow from the pipe 33 directly through the pipe 29 into the upper end of the cylinder so that it tends to lower the cutting element, while the air in the lower end of the cylinder is permitted to escape through the pipe 31 and an exhaust pipe 34. When the valve 32 is turned 90° to the right from the position shown in Fig. 4, air is supplied from the pipe 33 through the pipe 31 to the lower end of the cylinder, tending to raise the cutting element, while the pipe 29 is connected directly to the exhaust pipe 34 to permit the air to escape from the upper end of the cylinder.

The position of the valve 32 is determined by means of a crank arm 35, which is adapted to be shifted by means of lugs 36 and 37 projecting from the end 14 of the cutter carriage. As the carriage is advanced from the position shown in Fig. 5, the lug 36 engages one end of the crank arm 35 to shift the latter to the position shown in dotted lines, thus shifting the valve to a position to admit the compressed air to the lower end of the cylinder and to raise the cutting element. As the carriage returns, the lug 36 passes the end of the crank arm 35. The rear end of the lug 36 is inclined, as shown at 38, to make sure that the valve will not be shifted by the lug 36 upon its return movement. The lug 37, however, projects a greater distance from the end of the carriage than does the lug 36, and engages the end of the crank arm 35 to shift the valve as the knife carriage reaches the end of its reverse movement. This shifting to the position shown in full lines in Fig. 5, causes compressed air to be admitted to the upper end of the cylinder and causes the air to be exhausted from the lower end thereof. Thus, the cutting element is urged downwardly, but is still held in raised position, with the knives above the sheet 25, by the engagement of the roller 21 with the track 22. The cutting element is held in this position until the roller 20 is engaged by the projection 24 on the next table.

After the cutter carriage begins its advance and the roller 21 leaves the track 22, the cutting element drops, its downward movement being cushioned by the engagement of the piston 27 with the cushion 30. After the cutting element has dropped, the roller 21 at each side of the carriage is free and the roller 25 is engaged only by the abutment 24.

In order to properly control the knife, in case the compressed air fails to perform this function, it is advisable to provide a cam track 46, which is in position to be engaged by the roller 21, and which is inclined upwardly and forwardly until it reaches a higher level than that of the track 22. When this point is reached, the roller 20 rides over the upper end of the abutment 24 and permits the carriage to return to its initial position. The upward movement of the cutting element and the maintenance of the same in its uppermost position will be aided by the action of the compressed air in the lower ends of the cylinders. The corresponding ends of the two cylinders may be connected by a pipe, as indicated at 53, Fig. 2, to equalize the pressure.

In order to provide the force necessary for returning the carriage to its initial position, a cable 47 is attached to each side of the carriage and passes rearwardly about a sheave 48, which is mounted on a stud 49 secured to the rear stand 9. The cable extends thence forwardly over a sheave 50 similarly mounted on the front stand 9. The front end of the cable carries a weight 51. As the carriage advances with the table, therefore, the cable is drawn forwardly with the carriage, raising the weight 51. It is to be understood that there is a weight 51 at each side of the carriage and these weights are sufficient to return the carriage to its initial position as soon as it is released. A yieldable buffer 52 is attached to the end of the frame in position to stop the carriage at the completion of its return movement.

The broken lines at 28ª, Fig. 1, indicate approximately the position of the cylinder when the valve 32 is shifted to direct the pressure against the lower face of the piston head 27. The broken lines at 28ᵇ indicate approximately the position of the cylinder when the carriage begins its return movement.

It is to be noted that the cutting element comprises two downwardy divering blades 15 which are secured to the divergent faces of the lower portion 39 of the girder 16. These blades 15, as the cutting element descends, are brought into shearing engagement with ledger blades 40 secured to the adjacent ends of the tables.

For adjusting the engagement of the blades 15 with the ledger blades, a spreader 41 is adjustably supported by screws 43, the upper edge of the spreader being guided within a channel 42 formed in the lower edge of the extended portion 39 of the girder. As the cutting element descends, a narrow strip 44 is cut from the glass sheet 25, leaving the adjacent edges of the sheets square. The faces 45 of the blades 44 diverge downwardly so as to leave sufficient clearance to permit the waste strip 44 to drop downwardly into a pan 46 secured for that purpose beneath the end of one of the tables.

The sudden downward movement of the cutting element, and the construction of the latter, insures a quick, clean shearing action and this action is rendered smooth and uniform by reason of the inclination of the blades 15. The movement of the cutting element is greatly facilitated by the pneumatic means acting through the medium of the piston 27. The forward movement of the table advances the carriage in unison therewith, and by raising the weights 51, serves to store up the necessary energy for returning the carriage to its initial position.

While we have shown and described the present construction in considerable detail, it is to be understood that this is only for the purpose of illustration, and that various modifications may be made therein without any material departure from the scope of the invention as claimed.

What we claim is:

1. In a device of the character described, a travelling table for supporting material to be cut, a carriage supported for travel above the table, means for moving the carriage forwardly for a certain distance in predetermined relation to the table and for then returning the carriage to its initial position, a cutting element guided for vertical movement with respect to the carriage, a piston connected to the cutting element, a vertical cylinder in which said piston is guided, an air pressure supply pipe with branches leading, respectively, to the upper and lower ends of the cylinder, a valve controlling said pressure supply, and means on said carriage for shifting the valve to direct the pressure into the upper end of the cylinder during the first part of the advance of the carriage and then directing the pressure into the lower end of the cylinder.

2. In a device of the character described, a travelling table for supporting material to be cut, a carriage supported for travel above the table, means for moving the carriage forwardly in predetermined relation to the table, a cutting element guided for vertical movement with respect to the carriage, a piston connected to the cutting element and guided for vertical movement, means for supplying pnuematic pressure, means including a valve for controlling the direction of the pressure against the upper and lower faces of the piston alternately, an arm connected with the valve, and means on the carriage cooperating with said arm to shift the valve during the movement of the carriage.

3. The combination of a cutting element comprising a supporting member, blades secured to and diverging downwardly from said supporting member, adjustable means for varying the angle of divergence, and means for moving said cutting element across a sheet to be cut, in a plane perpendicular to said sheet.

4. The combination of a cutting element comprising a supporting member with oppositely disposed downwardly diverging faces, blades secured to said faces and extending downwardly therefrom, means for moving said cutting element across a sheet to be cut, in a plane perpendicular to said sheet, and means interposed between said blades and adjustable to increase their angle of divergence.

5. In a device of the character described, a traveling table for supporting material to be cut, a carriage supported for travel above the table, said carriage being provided with opposed guideways, a cutting element extending transversely above the table, slides supporting said cutting element at its opposite ends and movable vertically in said guideways, a relatively short horizontal track at each side of the table for supporting said slides to hold the cutting element in raised non-cutting position, means carried by the table and engaging the slides for moving the carriage and cutting element forwardly in predetermined relation to said table, and means for forcing the cutting element downwardly to cut the material upon movement of said slides out of engagement with said tracks.

6. In a device of the character described, a traveling table for supporting material to be cut, a carriage supported for travel above the table, said carriage being provided with opposed guideways, a cutting element extending transversely above the table, slides supporting said cutting element at its opposite ends and movable vertically in said guideways, a roller carried at the lower end of each slide, relatively short horizontal tracks upon which said rollers are supported, means carried by the table and engaging the slides inwardly of said rollers for moving the carriage and cutting element forwardly in predetermined relation to said table, and means for positively urging the cutting element downwardly when the rollers on said slides are moved out of engagement with said tracks.

7. In a device of the character described, a traveling table for supporting material to be cut, a carriage supported for travel above the table, means for moving the carriage forwardly for a certain distance in predetermined relation to the table and for then returning the carriage to its initial position, a cutting element guided for vertical movement with respect to the carriage, a piston connected to the cutting element, a vertical cylinder in which said piston is guided, an air pressure supply pipe with branches leading, respectively, to the upper and lower ends of the cylinder, a valve controlling said pressure supply, and means operable automatically upon movement of said carriage for shifting the valve to direct the pressure into the upper end of the cylinder during the first part of the advance of the carriage and then directing the pressure into the lower end of the cylinder.

In testimony whereof, we have hereunto signed our names to this specification.

HAROLD R. SCHUTZ.
HARRY E. ROBINSON.